United States Patent Office 3,248,449
Patented Apr. 26, 1966

3,248,449
PREPARATION OF CATALYSTS AND TO AN ISOMERISATION PROCESS IN WHICH SAID CATALYSTS ARE EMPLOYED
Anthony George Goble, Sunbury-on-Thames, Middlesex, England, assignor to The British Petroleum Company Limited, London, England, a British joint-stock corporation
No Drawing. Filed Nov. 20, 1962, Ser. No. 239,046
Claims priority, application Great Britain, Nov. 29, 1961, 42,653/61, 42,654/61
11 Claims. (Cl. 260—683.2)

This invention relates to the preparation of catalysts suitable for hydrocarbon conversion reactions, for example, for moving the position of the double bond in olefin hydrocarbons, and to their use for carrying out hydrocarbon conversion processes.

Catalyst containing a hydrogenating metal, alumina and halogen are known and have been proposed for use in a number of reactions. The form in which the halogen is present influences the activity of the catalyst.

It is an object of the invention to provide a method for the production of a novel catalyst. It is a further object to provide a catalyst suitable for effecting migration of an olefinic double bond and which when employed in this reaction is selective for this reaction only and which has substantially no skeletal isomerisation activity or polymerisation activity. It is further object to provide an improved isomerisation process.

According to one aspect of the present invention, there is provided a method of preparing a catalyst, suitable for hydrocarbon conversion reactions, which comprises the step of contacting a halogenatable inorganic oxide with an alkali metal compound or alkaline earth metal compound so that alkali metal or alkaline earth metal is retained by the oxide and, either before or after said step, contacting the oxide with a fluorine-containing compound so that fluorine is also retained by the oxide.

If desired the catalyst may contain other components in addition to the inorganic oxide, alkali metal or alkaline earth metal, and fluorine, these components being preferably added before the fluorination and preferably also before the addition of the alkali metal or alkaline earth metal. For example the catalyst may contain a minor proportion, preferably less than 25% wt. of a metal or metal compound having hydrogenating activity selected from Groups VIa or VIII of the Periodic Table. The preferred metal is a platinum group metal which may be present in an amount from 0.01 to 5% wt. and preferably 0.1 to 2% wt. The preferred platinum group metals are platinum and palladium.

A wide variety of fluorine-containing compounds have been proposed for use in the preparation of fluorine-containing compounds and the presence of fluorine in any form will normally confer some activity on a catalyst. The present invention therefore includes the use of any suitable fluorine-containing compounds. However, it has recently been found that certain fluorine-containing compounds confer particular forms of activity (for example low temperature isomerisation activity) not conferred by other fluorine-containing compounds. Preferably, therefore, the fluorine-containing compounds have the general formula $>CF_2$, particularly:

$$Y-X-F$$
$$\underset{Y'}{\overset{F}{|}}$$

(where X is carbon or sulphur and Y and Y' being the same or different are fluorine or hydrogen).

The inorganic oxide besides being halogenatable under the conditions specified above should also clearly have the desired physical characteristics to render it suitable as a hydrocarbon conversion catalyst. It is preferably a refractory oxide selected from Groups III to V of the Periodic Table, for example alumina, boria, silica, titania, or zirconia. The preferred refractory oxide is alumina. Mixtures of two or more inorganic oxides may be used if desired.

Preferably the alkali metal or alkaline earth metal is added to the inorganic oxide before the fluorine. By adding the components in this order catalyst preparation and the control of the amounts of the components added is facilitated. Some fluorine-containing catalysts are susceptible to hydrolysis in the presence of water. By making the fluorination the last stage in the preparation, the catalyst preparation can be completed in situ in a reactor, thereby eliminating the need for storing and transporting water-sensitive catalysts. The fact that the reactable group of the inorganic oxide are reacted first with the alkali metal compound or alkaline earth metal compound also facilitates the control of the fluorination which, as will be indicated later, is more critical than the control of the addition of the alkali metal compound or alkaline earth metal compound. Thus the catalyst activity and selectivity for certain reactions depends upon the relative amounts of alkali metal or alkaline earth metal and fluorine present. Good control over the amounts added is, therefore, necessary and the order of addition of the components used in the present invention is particularly suitable for exercising good control.

Preferably the alkali metal compound or alkaline earth metal compound which is used in the formation of the catalyst is an ionic compound. Preferably this compound is a compound which is capable of providing metal cations under the conditions under which it is brought into contact with the inorganic oxide or under conditions employed subsequently but prior to chlorination of the catalyst.

The precise way in which the addition of an alkali metal or alkaline earth metal acts to alter the activity of the catalyst is not known for certain but it is believed that the metal cation combines in some way with the inorganic oxide, possibly at the positions of active sites present on the surface of the oxide. Preferably therefore the oxide is treated after the contacting to dissociate the alkali metal or alkaline earth metal compound, for example by calcination, and the compound used is preferably one which can be dissociated without leaving other elements on the oxide. Particularly suitable compounds are carbonates, bicarbonates and the salts or organic acids, particularly carboxylic acids, for example formates, acetates and oxalates. The compounds may conveniently be added initially to the inorganic oxide by impregnation using a solution of the compound.

Preferred alkali metals are potassium and sodium, particularly the former.

The amount of alkali metal or alkaline earth metal retained may be small in relation to the amount of inorganic oxide, for example in the range 0.01–10% by weight of inorganic oxide. The minimum amount necessary in any given application to render the catalyst selective may be determined by experiment. Metal present in excess of the minimum amount will reduce the amount of fluorine that can be taken up by the oxide. Preferably, the amount of metal is at least 1% wt. and more particularly at least 2% wt. Depending on the amount of metal present, the amount of fluorine taken up may be in the range 0.1 to 10% wt., preferably 1 to 6% wt. However, as indicated later, the reaction of the alkali metal or alkaline earth metal and the fluorine with the inorganic oxide is considered to be a surface phenomenon. When considering the desirable amount of the components for any given oxide, the surface area oxides require proportionately greater amounts of the components than lower surface area oxides.

Suitable fluorine-containing compounds are carbon tetrafluoride, fluoroform, methylene fluoride, and the corresponding sulphur compounds, carbon tetrafluoride being preferred. Carbon tetrafluoride is an extremely stable compound and is not, prima facie, an obvious choice for preparing fluorine containing catalysts. Nevertheless it has been found suitable and it has advantages over other fluorinating compounds. As compared with hydrogen fluoride, for example, it is non-corrosive, easier to handle, readily utilisable in the vapour phase, less liable to damage the alumina and more suitable for preparing catalyst with high fluorine contents. As compared with alkyl fluorides containing a higher number of carbon atoms for example tertiary butyl fluoride, it is less likely to produce carbonaceous or hydrocarbonaceous deposits on the catalyst during fluorination.

Since according to a preferred feature of the invention the main fluorination reaction takes place after the addition of the alkali metal or alkaline earth metal, it follows that the inorganic oxide used should not contain large amounts of halogen. However it has been found that small amounts (for example up to 1% wt.) of halogen can be initially present in the inorganic oxide without adversely affecting the subsequent treatments. Thus the inorganic oxide subject to the process of the present invention may be a platinum-alumina catalyst containing up to 1% wt. of halogen such as is normally used for the reforming of gasoline boiling range hydrocarbons.

The characteristic of an inorganic oxide which renders it halogenatable under the conditions specified without the formation of free fluoride is believed to be the original presence of hydrogen. Alumina is the preferred inorganic oxide and it is a characteristic of activated alumina normally used for hydrocarbon conversion catalysts that, although predominantly alumina, they do contain a small amount of hydrogen, usually less than 1% wt. This hydrogen is generally considered to be in the form of surface hydroxyl groups, which form acid or potentially acid sites. Since the fluorination is essentially a surface phenomenon the amount of fluorine which can be added without the formation of free fluorine is related to the surface area, the greater the surface area, the greater the amount of fluorine which can be added. However, the earlier treatment with the alkali metal compound or alkaline earth metal compound will have caused some modification of the reactive surface group and the amount of fluorine that can be added will be controlled by this earlier treatment and will be less than the amount which could have been added if the catalyst had not been treated with an alkali metal compound or alkaline earth metal compound. In practice, it has been found that provided an adequate quantity of alkali metal or alkaline earth metal is present, the amount of fluorine that can be added, is up to a half or- in some cases, rather more than a half, i.e. up to $2.5 \times 10^{-4}$ grams of fluorine/square metre of original surface area of the inorganic oxide. Maximum fluorination is therefore preferred and a convenient range is therefore $1.0 \times 10^{-4}$ to $2.5 \times 10^{-4}$ grams/sq. metre. Having regard to the surface areas which suitable inorganic oxides normally have this means a fluorine content of at least 1% by weight, and it may be up to 10% wt.

Any of the forms of alumina suitable as a base for reforming catalysts may be used, but a particularly preferred form is one derived from an alumina hydrate precursor in which the trihydrate predominates. One containing a major proportion of β-alumina trihydrate is particularly suitable. A convenient method of preparing the alumina is by hydrolysis of an aluminium alcoholate, for example aluminum isopropoxide, in an inert hydrocarbon solvent, for example benzene. Other things being equal, the greater the amount of fluorine taken up by the alumina, the greater is the activity of the catalyst and since, as stated above, the maximum amount of fluorine which can be added is related to the surface area, it is desirable that the alumina should have a high surface area for example, more than 250 square metres/gram and preferably more than 300 square metres/gram.

When the catalyst contains a hydrogenating metal, this metal is, as stated above, desirably incorporated with the alumina prior to the fluorination and preferably also prior to the alkali metal or alkaline earth metal treatment. When using a platinum group metal it is also desirable that it should be finely dispersed as small crystallites on the alumina, suitable criteria for the size of the crystallites being that they art not detectable by X-ray diffraction or that on treatment of the platinum group metal-alumina composite with benzene at 250° C. they have a measurable benzene chemisorption, preferably not less than 0.1 molecule of benzene adsorbed/atom of platinum and not less than 0.03 molecule of benzene adsorbed/atom of palladium. Details of the benzene chemisorption technique have been published in "Actes du Deuxieme Congres International de Catalyse," Paris, 1960, vol. 2, page 1851.

A convenient method of obtaining the platinum group metal in the required state of sub-division is to add a solution of a platinum group metal compound to a hydrogel of the alumina and to precipitate the platinum group metal as a sulphide, for example by treatment with hydrogen sulphide. The treatment of the platinum group metal-alumina composite with the fluorine compound is preferably given with the platinum group metal in a reduced state, and this can conveniently be achieved by pretreating the composite with hydrogen. When a platinum group metal-alumina composition is treated with a fluorine compound according to the present invention it is believed that a portion of the fluorine taken up is associated with the platinum group metal as an active complex.

Preferably the contacting of the alumina with the fluorine compound is carried out under non-reducing conditions to prevent formation of corrosive hydrogen fluoride.

The non-reducing conditions used for the fluorination may be either inert or oxidising conditions, the latter being preferred. A convenient method of contacting the alumina is to pass a gaseous stream of the fluorine compound over the alumina either alone or, preferably, in a non-reducing carrier gas. Examples of suitable carrier gases are nitrogen, air or oxygen. The vapour may be recycled, desirably until all the fluorine has been used, and in this way an accurate control of the amount of fluorine taken up by the catalyst may be obtained.

When using the preferred fluorinating compounds, non-reducing conditions are essential, since reducing conditions tend to convert the fluorine compound to hydrogen fluoride. In addition to the amount of alkali metal or alkaline earth metal present, the temperature, time of contact and amount of fluorine compound used may affect the amount of fluorine taken up by the catalyst, increase of any of these tending to increase the amount taken up. The temperature for the halogenation is preferably from 300–1100° F. (149–593° C.). Preferred temperatures using fluorine-containing compounds are in the range 300–500° C. particularly 350–450° C. and the time of contact may be from 5 minutes to 24 hours, particularly 10 minutes to 10 hours. In general higher temperatures are used with lower contact times and vice versa. The amount taken up should not be sufficient to destroy the oxide structure as indicated by X-ray diffraction nor from detectable amounts of free fluoride or volatile hydrogenating metal-fluorine complexes.

When treating a platinum group metal-alumina composite, care should also be exercised to prevent the formation of volatile platinum complexes, the tendency for the formation of such complexes again increasing with increasing temperature. When treating platinum group metal-alumina composites the temperature is preferably 300–700° F. (149–371° C.), platinum-on-alumina composites being more particularly treated at 450–600° F.

(232–316° C.) and palladium-on-alumina composites at 500–650° F. (260–343° C.). The fluorination reaction is exothermic and the temperatures specified are the initial temperatures used.

The rate of addition of the fluorine compounds is preferably as low as practicable to ensure uniform fluorination and to avoid a rapid increase of temperature as a result of the exothermic reaction. Preferably the addition rate does not exceed 1.3% wt. of fluorine compound by weight of catalyst per minute. If a carrier gas is used the rate of flow is preferably at least 200 volumes/volume of catalyst/hour and a convenient range is 200–1000 v./v./hr. The pressure used is conveniently atmospheric.

As stated earlier the active catalyst is susceptible to hydrolysis in the presence of water. If prepared away from its point of use, it should, therefore, be stored under anhydrous conditions but preferably the fluorinating stage is not carried out until the catalyst is in position in a reactor. Similarly the materials used in the catalyst preparation should also be free from water.

Catalysts prepared by the process of the present invention are particularly suitable for moving the position of the double bond in olefin hydrocarbons. Thus according to another aspect of this invention there is provided a process for the isomerisation of an olefinic hydrocarbon which is capable of undergoing double bond migration which comprises contacting the olefin with a catalyst which has been prepared as hereinbefore described.

Isomerisation in accordance with the present invention may be carried out using as feedstock any olefin capable of double bond migration or a mixture comprising at least one such olefin. Clearly, when employing mixtures, the components will not be present in the equilibrium proportions corresponding to the isomerisation conditions. Double bond isomerisation will usually be effected without producing substantial yields of olefins which have undergone a change of the carbon skeleton.

The olefin may be a mono-olefin, di-olefin or other polyolefin; however, the preferred feedstocks are mono-olefins. Preferably the olefin has 4–6 carbon atoms/molecule.

The process of this invention is particularly suitable for the conversion to 2-methylpentene-2 of 4-methylpentene-1, and/or 2-methylpentene-1; also, the conversion to 2-methylbutene-2 of 2-methylbutene-1 and/or 3-methylbutene-1; also for the conversion to cis- and trans-pentene-2 of pentene-1.

Preferably isomerisation is carried out at a temperature in the range ambient —300° C. more particularly 100–200° C. at any pressure being sub-atmospheric, atmospheric or super-atmospheric. Usually it will be desirable to maintain vapour phase conditions and the pressure will be selected accordingly. Usually the isomerisation will be carried out in the presence of a carrier gas, suitably nitrogen.

The process for the production of catalysts according to the present invention and the use of the catalyst so prepared according to the invention is illustrated by the following examples:

*Example 1*

100 ml. portions of a platinum-on-alumina catalyst, containing 0.58 percent weight platinum and 0.81 percent weight chlorine, were calcined for one hour at 500° C. They were then immersed in solutions of sodium acetate in 200 ml. of deionised water. The solutions contained respectively 12.5 and 25 grams of crystalline sodium acetate. After two hours the catalysts were filtered off and dried overnight at 120 C. before being finally calcined at 500° C. for one hour. The resulting catalysts had sodium contents of 0.44 and 1.07 percent weight respectively.

35 ml. portions of these two catalysts, and of the original platinum-on-alumina, were then fluorinated by treatment for 20 minutes at 450° C. with dry carbon tetrafluoride flowing at 150 ml./min. After a final nitrogen purge the catalysts were removed and stored in dry containers.

The fluorine analyses given below show the variation of fluorine content with alkali metal content that can be obtained.

| Catalyst | Sodium content of catalyst to be fluorinated, percent weight | Final fluorine content, percent weight |
|---|---|---|
| I | Nil | 4.7 |
| II | 0.44 | 1.5 |
| III | 1.07 | 0.54 |

*Example 2*

The olefin isomerisation activity of this type of catalyst was examined using 4-methylpentene-1 (ca. 100 mm. partial pressure in nitrogen). The conversion data given in the table below (obtained after two hours on stream at 130° C. and with a vapour residence time of four seconds) illustrate the benefit of the alkali metal component.

| Catalyst | 2-methyl-pentene-2, percent weight | 2-methyl-pentene-1, percent weight | By product (mainly cis and trans) 3-methyl-pentene-2 |
|---|---|---|---|
| Untreated Pt-Al$_2$O$_3$ | 11.7 | 2.8 | Trace |
| CF$_4$-treated Pt-Al$_2$O$_3$ (at 450° C.) | 55.3 | 13.5 | 4.7 |
| Untreated Na-Pt-Al$_2$O$_3$ [1] | Nil | Nil | Nil |
| CF$_4$-treated Na-Pt-Al$_2$O$_3$ | 63.6 | 13.7 | Trace |
| Equilibrium values | 67.9 | 18.8 | |

[1] 0.8 percent weight Na.

I claim:

1. A method of preparing a catalyst suitable for hydrocarbon conversion reactions comprising the step of contacting a halogenatable inorganic oxide with a compound selected from the group consisting of compounds of alkali metals and alkaline earth metals so that a metal selected from the group consisting of alkali metals and alkline earth metals is retained by said oxide in amount from at least 0.8 to 10% by weight of said inorganic oxide and contacting said oxide with a fluorine containing compound of general formula

where X is an atom selected from the group consisting of C and S and Y and Y$^1$ are selected from the group consisting of hydrogen and fluorine, said fluorine containing compound being used under non-reducing conditions and at a temperature in the range of 140° C.–593° C. such that fluorine is taken up by said oxide in amount such that the weight of fluorine retained is from 1.0 to 10% by weight of total catalyst, without the production of free fluoride.

2. A method as claimed in claim 1 wherein the catalyst contains from 0.1 to 5% by weight of a substance having hydrogenating activity selected from the group consisting of metals of and metal compounds of Group VIII of the Periodic Table according to Mendeléeff, said substance being added prior to fluorination.

3. A method as claimed in claim 2 wherein said substance having hydrogenating activity is added prior to the addition of said compound selected from the group consisting of compounds of alkali metals and akaline earth metals.

4. A method as claimed in claim 1 wherein said chlorine-containing compound is carbon tetrafluoride.

5. A method as claimed in claim 1 wherein said inorganic oxide is alumina.

6. A method as claimed in claim 1 wherein said inorganic oxide is alumina used in admixture with at least one other inorganic oxide.

7. A method as claimed in claim 1 wherein the alkali metal and alkaline earth metal containing compounds are compounds of alkali metals and alkaline earth metals selected from the group consisting of carbonates, bicarbonates and salts of organic acids.

8. A method as claimed in claim 1 wherein said inorganic oxide is contacted with said compound selected from the group consisting of compounds of alkali metals and alkaline earth metals and thereafter with said fluorine-containing compound.

9. A process for the isomerisation of an olefinic hydrocarbon which is capable of undergoing double bond migration which comprises contacting said olefinic hydrocarbon with a catalyst as claimed in claim 1 at a temperature in the range 0° C.–300° C.

10. A process as claimed in claim 9 in which the olefinic hydrocarbon is 4-methylpentene-1.

11. A process as claimed in claim 9 in which isomerisation is effected at a temperature in the range 100° C.–200° C.

References Cited by the Examiner

UNITED STATES PATENTS

| | | | |
|---|---|---|---|
| 2,479,110 | 8/1949 | Haensel | 208—139 |
| 2,602,772 | 7/1952 | Haensel | 208—139 |
| 2,642,384 | 6/1953 | Cox | 208—139 |
| 2,924,629 | 2/1960 | Donaldson | 260—683.2 |

ALPHONSO D. SULLIVAN, *Primary Examiner.*